United States Patent [19]

Inoue et al.

[11] Patent Number: 5,147,943
[45] Date of Patent: Sep. 15, 1992

[54] BIPHENYTETRACARBOXYLIC ACID-DERIVED POLYIMIDES WITH POLYEPOXIDES

[75] Inventors: Hiroshi Inoue; Tetsuji Hirano, both of Hirakata, Japan

[73] Assignee: Ube Industries, Ltd., Yamaguchi, Japan

[21] Appl. No.: 467,549

[22] Filed: Jan. 19, 1990

[30] Foreign Application Priority Data

Jan. 20, 1989 [JP] Japan .................................. 1-9867

[51] Int. Cl.$^5$ ................ C08L 63/02; C08L 63/04; C08L 63/08; C08L 79/08
[52] U.S. Cl. .................... 525/423; 525/504; 525/533
[58] Field of Search ................ 525/423, 533, 504

[56] References Cited

U.S. PATENT DOCUMENTS

| | | | |
|---|---|---|---|
| 3,920,768 | 11/1975 | Kwiatkowski | 525/533 |
| 4,277,583 | 7/1981 | Waitkus et al. | 525/423 |
| 4,410,664 | 10/1983 | Lee | 525/423 |
| 4,557,860 | 12/1985 | DiSalvo et al. | 525/423 |
| 4,705,833 | 11/1987 | Saito et al. | 525/423 |
| 4,757,150 | 7/1988 | Guggenheim et al. | 548/461 |
| 4,778,872 | 10/1988 | Sasaki et al. | 528/353 |
| 4,794,148 | 12/1988 | Nakamura et al. | 525/423 |
| 4,820,779 | 4/1989 | Schoenberg | 525/533 |
| 4,948,831 | 8/1990 | Nishi et al. | 525/423 |

FOREIGN PATENT DOCUMENTS 54-64597 5/1979 Japan.
63-75034 4/1988 Japan.

*Primary Examiner*—Robert E. Sellers
*Attorney, Agent, or Firm*—Finnegan, Henderson, Farabow, Garrett & Dunner

[57] ABSTRACT

A thermosetting resin composition useful for heat-resistant adhesive agents and cured shaped articles, comprising (A) a terminal imide oligomer having hydroxyl groups prepared, in an organic medium, from a biphenyltetracarboxylic acid ingredient, an aromatic diamine ingredient and a modifying monoamine ingredient having at least one hydroxy group, and exhibiting a logarithmic viscosity number of 0.01 to 1 at 30° C., and (B) an organic compound having at least two epoxy groups, the imide oligomer optionally being in the state of a partial reaction product of the above-mentioned ingredients.

17 Claims, No Drawings

BIPHENYTETRACARBOXYLIC ACID-DERIVED POLYIMIDES WITH POLYEPOXIDES

BACKGROUND OF THE INVENTION

1. Field of the Invention

The present invention relates to a thermosetting resin composition. More particularly, the present invention relates to a thermosetting resin composition comprising a modified aromatic imide oligomer having terminal hydroxyl groups and an organic compound having at least one epoxy group.

The thermosetting resin composition of the present invention is useful as a thermosetting imide-epoxy type adhesive agent and molding material having an excellent heat resistance.

2. Description of the Related Arts

Generally, although epoxy resin compositions and cured articles thereof exhibit an excellent dimensional stability and electric properties, and thus are useful in various technical fields, the cured articles of the epoxy resin composition do not always have a satisfactory heat resistance.

Therefore, in an attempt to improve the heat resistance of the epoxy resin compositions, an organic compound having epoxy groups is used in combination with a polyimide or imide oligomer compound exhibiting a high heat resistance. In general, however the polyimide and imide oligomer compounds exhibit a very poor solubility in organic solvents, and an extremely high softening point, and thus cannot be easily and uniformly mixed with the organic compound having epoxy groups, and therefore, it is difficult to prepare a uniform resinous composition of the organic compound having epoxy groups with the polyimide or imide oligomer compound.

To overcome the above-mentioned difficulty, attempts have been made to mix a polyamic acid, which is a precursor of the polyimide and exhibits an excellent solubility in various organic solvents, with the organic compound having epoxy groups. The polyamic acid is disadvantageous, however, in that the conversion of the polyamic acid to the corresponding polyimide at a high temperature causes a generation of a by-product consisting of water, and the generated water causes a deterioration in the physical properties of the resultant cured polyimide article.

In a recent attempt to overcome the above-mentioned disadvantages, the organic compound having epoxy groups was used in combination with an imide oligomer having a low molecular weight and provided with terminal groups reactive to the epoxy groups, to provide a thermosetting resin composition. For example, Japanese Unexamined Patent Publication (Kokai) No. 54-64597 discloses a modified imide oligomer having terminal hydroxyl groups, which is assumed to be prepared by using 5-bicyclo[2,2,2]oct-7-ene-2,3,5,6-tetracarboxylic dianhydride; U.S. Pat. No. 4,820,779 discloses a carbinol structure-containing polyimide oligomer produced from carbinoltetracarboxylic acid, an aromatic diamine, and a primary amine or dicarboxylic acid, and having terminal groups reactive to the epoxy groups, for example, terminal amine, phenol, thiol or carboxyl groups; U.S. Pat. No. 4,757,150 discloses an ether imide oligomer having terminal hydroxyl groups, prepared from bisphenol A tetracarboxylic dianhydride; and Japanese Unexamined Patent Publication (Kokai) No. 63-75034 discloses a thermosetting modified imide oligomer having an aromatic imide structure formed by an imide-forming reaction of an m,m'-type aromatic diamine compound with a tetracarboxylic dianhydride compound and terminal addition-reactive groups, for example, maleic anhydride residue.

The above-mentioned conventional imide oligomers having terminal hydroxyl groups do not always have a satisfactory heat resistance, and further, must be prepared by using very special and expensive tetracarboxylic acid compounds, and accordingly, are difficult to prepare or obtain, and thus to be industrially utilized.

As described in Comparative Example 1 of U.S. Pat. No. 4,820,779, a modified imide oligomer having a terminal hydroxyl group and prepared by using benzophenone tetracarboxylic dianhydride, which is popular as an aromatic tetracarboxylic and component, is substantially insoluble in organic solvents, and thus is useless as a component of epoxy resin composition.

SUMMARY OF THE INVENTION

An object of the present invention is to provide a thermosetting resin composition comprising an organic compound having epoxy groups and a modified imide oligomer provided with terminal hydroxyl group and having a satisfactory compatibility with the organic compound having epoxy groups, and useful for preparing a thermosetting adhesive agent and molding material having an excellent heat resistance.

The above-mentioned object can be attained by the thermosetting resin composition of the present invention comprising:

(A) at least one type of modified imide oligomer having terminal hydroxyl groups, which oligomer is a reaction product of (a) a tetracarboxylic acid component consisting essentially of (i) 70 to 100 molar % of a principal acid ingredient consisting of at least one member selected from the group consisting of biphenyltetracarboxylic acids, and dianhydrides, esters and salts thereof and (ii) 0 to 30 molar % of an additional acid ingredient consisting of at least one member selected from other aromatic tetracarboxylic acids than biphenyltetracarboxylic acids, and dianhydrides, esters and salts thereof, with (b) an amine component consisting essentially (iii) a principal diamine ingredient consisting of at least one aromatic diamine compound and (iv) a modifying monoamine ingredient consisting of at least one monoamine compound having at least one hydroxyl group, in a reaction medium, is provided with imide structures and terminal hydroxyl groups and exhibits a logarithmic viscosity number of from 0.01 to 1 determined at a concentration of 0.5 g/100 ml in a solvent consisting of N,N-dimethyl-acetamide at a temperature of 30° C.; and (B) at least one type of organic compound having at least two epoxy groups.

In the thermosetting resin composition of the present invention, the modified imide oligomer (A) and the organic compound (B) having epoxy groups, may be in the state of a partial reaction product whereof.

The present invention further includes a cured material produced by heating the above-mentioned thermosetting resin composition at an elevated temperature.

DESCRIPTION OF THE PREFERRED EMBODIMENTS

The thermosetting resin composition of the present invention comprises (A) a specific modified imide oligomer having terminal hydroxyl groups and (B) an organic compound having epoxy groups.

The modified imide oligomer (A) is a reaction product of (a) a tetracarboxylic acid component consisting essentially of (i) 70 to 100 molar % of a principal acid ingredient consisting of at least one member selected from the group consisting of biphenyltetracarboxylic acids, and dianhydrides, esters and salts thereof and (ii) 0 to 30 molar % of an additional acid ingredient consisting of at least one member selected from other aromatic tetracarboxylic acids than biphenyltetracarboxylic acids, and dianhydrides, esters and salts thereof, with (b) an amine component consisting essentially of (iii) a principal diamine ingredient consisting of at least one aromatic diamine compound and (iv) a modifying monoamine ingredient consisting of at least one monoamine compound having at least one hydroxyl group, in a reaction medium.

The total equivalent of the acid dianhydride groups in the tetracarboxylic acid component is substantially equal to the total equivalent of the amino groups in the amine component.

The modified imide oligomer has hydroxyl groups located in the terminals of the molecule thereof and a plurality of imide structures located in the main chain of the molecule thereof.

The modified imide oligomer (A) of the present invention has a relatively small molecular weight, and thus exhibits a logarithmic viscosity number of from 0.01 to 1.0, preferably from 0.02 to 0.8, more preferably 0.03 to 0.7, determined at a concentration of 0.5 g/100 ml in a solvent consisting of N,N-dimethylacetamide at a temperature of 30° C.

Also, the modified imide oligomer (A) is in the state of a solid (powder) at room temperature and exhibits a melting point of from 100° to 300° C., preferably from 150° to 280° C., and an excellent solubility in organic solvents.

The biphenyltetracarboxylic acid compounds usable for the principal acid ingredient (i) of the tetracarboxylic acid component (a) are preferably selected from the group consisting of 3,3',4,4'-biphenyltetracarboxylic acid and 2,3,3',4'-biphenyltetracarboxylic acid, and dianhydrides, lower alkyl esters and salts thereof. More preferably, the principal acid ingredient (i) comprises 2,3,3',4'-biphenyltetracarboxylic dianhydride (a-BPDA) or a lower alkyl ester or salt thereof.

The other aromatic tetracarboxylic acid compounds usable for the additional acid ingredient (ii) of the tetracarboxylic acid component (a) are preferably selected from 3,3',4,4'-benzophenonetetracarboxylic acid, pyromellitic acid, 2,2-bis(3',4'-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, bis(3,4-dicarboxyphenyl)sulfone and aliphatic tetracarboxylic acids and dianhydrides, lower alkyl esters and salts of the above-mentioned acids.

The aliphatic tetracarboxylic acid compounds are preferably butane tetracarboxylic acid and dianhydride lower alkyl esters, and salts thereof In the tetracarboxylic acid component (a), when the content of the principal acid ingredient (i) is less than 70 molar %, the resultant modified imide oligomer is disadvantageous in that the resultant imide oligomer exhibits a poor solubility in organic solvents and the resultant cured material exhibits an unsatisfactory heat resistance.

The aromatic diamine compound usable for the principal diamine ingredient (iii) of the amine component (b) is preferably selected from the following groups:

1. Diamine compounds having one aromatic ring
   (1) Phenylene diamine compounds, for example, m-phenylenediamine and p-phenylenediamine
   (2) Xylylene diamine compounds, for example, 3,5-xylylenediamine and 2,4-xylylenediamine
   (3) Diamino-trialkylbenzene compounds, for example, 3,5-diethyltoluene-2,4-diamine (2,4-DETDA), and 3,5-diethyltoluene-2,6-diamine (2,6-DETDA)

2. Diamine compounds having two aromatic rings
   (1) Diamino-biphenyl compounds, for example, 4,4'-diamino-3,3'-dimethyl-biphenyl, and 4,4'-diamino-3,3'-dimethoxy-biphenyl (o-dianisidine: o-DADN)
   (2) Diamino-diphenylether compounds, for example, 4,4'-diaminodiphenylether, 3,4'-diaminodiphenylether and 3,3'-diaminodiphenylether
   (3) Diamino-diphenylthioether compounds, for example, 4,4'-diaminodiphenylthioether and 3,4'-diaminodiphenylthioether
   (4) Diamino-benzophenone compounds, for example, 4,4'-diaminobenzophenone and 3,4'-diaminobenzophenone
   (5) Diamino-diphenylsulfone compounds, for example, 3,3'-diaminodiphenylsulfone (3,3'-DDS), and 4,4'-diaminodiphenylsulfone (4,4'-DDS)
   (6) Diamino-bis(phenoxy) propane compounds, for example, 2,2-bis (4'-aminophenoxy) propane, and 2,2-bis(3'-aminophenoxy) propane
   (7) Diamino-diphenylalkane compounds, for example, 3,3'-diaminodiphenylmethane, 4,4'-diaminodiphenylmethane (DADM), 4,4'-methylene-bis(2,6-diethylaniline) (M-DEA), bis(2-ethyl-6-methyl-4-aminophenyl)methane, 4,4'-methylene-bis(2-ethyl-6-methylaniline) (M-MEA), 2,2-bis(3-aminophenyl) propane, 2,2-bis(4-aminophenyl) propane, 2,2-bis(3-chloro-4-amino-phenyl) propane, and 2,2-bis(3-amino-4-hydroxyphenyl) hexafluoropropane (BHFP)

3. Diamine compounds having three aromatic rings
   (1) Diamino-bis(phenoxy) benzene compounds, for example, 1,3-bis(4-aminophenoxy)benzene (TPR-R), 1,3-bis(3-aminophenoxy)benzene, and 1,4-bis(4-aminophenoxy) benzene (TPE-Q)

4. Diamine compounds having four aromatic rings
   (1) Diamino-bis[(phenoxy)phenyl]propane compounds, for example, 2,2-bis[4-(4-aminophenoxy)phenyl]propane (BAPP), and 2,2-bis[4-(4-aminophenoxy)phenyl]hexafluoropropane (BAFP)
   (2) Diamino-bis(phenoxy)diphenylsulfone compounds, for example, 4,4'-bis(4-aminophenoxy)diphenylsulfone, bis[4-(4-aminophenoxy)phenyl]suffone (4-BAPS), 4,4'-bis(3-aminophenoxy)diphenylsulfone, and bis[4-(3-aminophenoxy)phenyl]sulfone (3-BAPS)

The above-mentioned aromatic diamine compounds can be used alone or in any combination of two or more thereof.

More preferably, the aromatic diamine compounds usable for the present invention are selected from the group consisting of diaminodiphenylether compounds, diaminodiphenylalkane compounds, diaminobis(phenoxy) diphenylpropane compounds, diaminobiphenyl compounds, and diamino-bis(phenoxy) benzene compounds.

The monoamine compounds having at least one hydroxyl group and usable for the modifying monoamine ingredient (iv) of the amine component (b) are preferably selected from the group consisting of aromatic monoamine compounds having one hydroxyl group, for example, aminophenol, aminocresol, 4-hydroxy-4'-aminodiphenylether, 4-hydroxy-4'-aminobiphenyl, and aminobenzyl alcohol; aliphatic monoamine compounds having one hydroxyl group, for example, aminoethanol, aminopropanol and aminobutanol, and monoamine compound having two or more hydroxyl groups, for example, 2-amino-2-methyl-1,3-propanediol.

The modifying monoamine ingredient (iv) in the amine component (b) is preferably in an amount of from 3 molar % to 70 molar %.

The modified imide oligomers having terminal hydroxyl group are preferably of the formula (I):

tant imide oligomer is provided with imide structures and terminal hydroxyl groups.

In a preferable method of preparing a modified imide oligomer (A) of the present invention having terminal hydroxyl groups, 2,3,3',4'-biphenyltetracarboxylic dianhydride, an aromatic diamine compound and a monoamine compound having at least one hydroxyl group are uniformly dissolved in the above-mentioned polar organic solvent; the reaction mixture is heated at a temperature of from about 5° C. to 60° C. for 1 to 120 minutes, while stirring, to prepare a amic acid oligomer; the reaction mixture is heated at a temperature of from 140° C. to 250° C., more preferably from 150° C. to 200° C., and stirred at this temperature for 5 to 180 minutes to imidize the amic acid oligomer; and finally, the resultant reaction mixture is cooled to room temperature.

The resultant modified imide oligomer can be isolated in the form of fine particles by pouring the above-mentioned resultant reaction mixture into water. The iso-

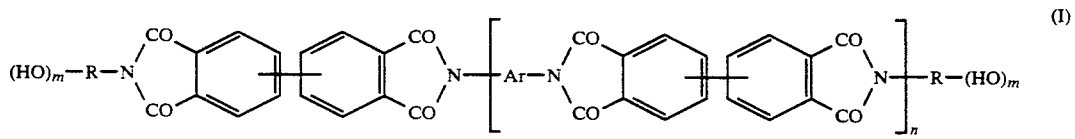

n represents zero or an integer of from 1 to 80, preferably from 1 to 50, and m represents an integer of 1 or 2.

In the preparation of the modified imide oligomer, the reaction of the tetracarboxylic acid component (a) with the amine component (b) is carried out in an organic medium.

The organic medium preferably comprises at least one member selected from the group consisting of amide solvents, for example, N,N-dimethylformamide, N,N-dimethylacetamide, N-methyl-2-pyrrolidone (NMP) and N-methylcaprolactam; sulfur or phosphorus atom-containing solvents, for example, dimethylsulfoxide, hexamethylphosphoramide, dimethylsulfone, tetramethylenesulfone and dimethyltetramethylenesulfone; phenolic solvents, for example, cresole and phenol; and other solvents, for example, pyridine, ethylene glycol and tetramethyl urea.

In the preparation of the modified imide oligomer (A) having terminal hydroxyl groups, the reaction of the tetracarboxylic acid component, for example, 3,3',4,4'- or 2,3,3',4'-biphenyl tetracarboxylic acid compounds, preferably, dianhydride thereof, with the amino component consisting of an aromatic diamine compound and a monoamine compound having one or more hydroxyl groups, the total equivalent of the anhydride groups in the tetracarboxylic acid component being substantially equal to the total equivalent of the amine groups in the amine component, is preferably carried out in a polar organic medium at a temperature of 100° C. or less, more preferably 80° C. or less, to provide an oligomer having at least one amide acid structure (referred to hereafter as an amic acid oligomer), and then the amic acid oligomer is converted to the corresponding imide oligomer by adding an imidizing agent, for example, acetic anhydride, to the amic acid oligomer system, at a relatively low temperature of from 0° C. to 140° C., or by heating the amic acid oligomer system at a relatively high temperature of from 140° C. to 250° C. In the conversion reaction, the amio acid structures in the oligomer is dehydrated and imide-cyclized. The resullated, modified imide oligomer can be used by dissolving in a polar organic solvent. Alternatively, the resultant reaction mixture can be directly used at the original concentration thereof, or can be concentrated or diluted with a solvent to a desired concentration and then used as desired.

In the preparation of the solution of the modified imide oligomer, the polar organic solvent may consist of the same organic compounds as those usable for the preparation of the modified imide oligomer. Alternatively, the organic solvent may be selected from oxygen atom-containing organic solvents, for example, dioxane, methylethylketone and mono- and di-glymes, and if necessary, the above-mentioned organic solvent may be mixed with an additional organic solvent, for example, aromatic hydrocarbones, for example, benzene, toluene or xylene, and another organic solvent, for example, solventnaphtha, benzonitrile, acetone, and methylalcohol.

In the thermosetting resin composition of the present invention, the organic epoxy compound (B) is not limited to a specific group of epoxy compounds, as long as the compound (B) is provided with at least two epoxy groups in the molecule thereof.

The organic compounds having two or more epoxy groups are preferably selected from the group consisting of epoxidized bisphenol A compounds, epoxidized bisphenol F compounds, epoxidized resorcinol compounds, epoxidized tetrahydroxydiphenylethane compounds, epoxidized phenolic novolak compounds, epoxidized cresol novolak compounds, epoxidized polyolefin compounds, epoxidized cycloaliphatic compounds, and epoxidized soyabean oils.

The above-mentioned epoxidized compounds can be used alone or in any combination of two or more thereof.

In the thermosetting resin composition of the present invention, the modified imide oligomer (A) is preferably used in an amount of 1% to 95%, more preferably 5 to 90%, based on the total weight of the modified imide oligomer (A) and the organic compound (B) having epoxy groups.

The thermosetting resin composition of the present invention may be in the form of a solid mixture of the modified imide oligomer solid particles and the organic compound having epoxy groups solid particles; in the form of a dispersion of the modified imide oligomer solid particles in a liquid organic compound having epoxy groups; or in the form of a uniform solution of the modified imide oligomer and the organic compound having epoxy groups in an organic solvent. The above-mentioned uniform solution of the modified imide oligomer and the organic compound having epoxy groups, in the solvent, may be converted to a dry solid mixture by evaporating the organic solvent from the solution. The organic solvent mentioned above may be selected from the organic solvents usable for the preparation of the modified imide oligomer, and the oxygen atom-containing organic solvent capable of dissolving the modified imide oligomer.

The thermosetting resin composition of the present invention can be used in the form of a mixture with an additive consisting of at least one member selected from, for example, curing accelerators, epoxy-curing agents, curing catalysts, inorganic fillers, and organic additives.

The epoxy-curing agent may comprise, for example, a phenol novolak compound, amino compound or acid anhydride compound.

The curing catalyst may comprise a phosphine derivative, tertiary amine compound or imidazol compound.

The thermosetting resin composition involves a partial reaction product of the modified imide oligomer (A) with the organic compound having epoxy groups at an elevated temperature of, for example, from 35° to 200° C., and this partial reaction product exhibits a certain softening or melting point. Note, this type of resin composition of the present invention will be referred hereinafter to as a B-stage thermosetting resin composition.

The B-stage thermosetting resin composition of the present invention is preferably in the form of a fine powder at room temperature, exhibits a softening point of from 35° C. to 200° C., and can be converted to a hardened material or article having a high heat resistance by curing at a high temperature of, for example, 100° to 250° C.

Preferably, the B-stage thermosetting resin composition of the present invention exhibits an apparent logarithmic viscosity number of 0.1 to 5.0, more preferably 0.5 to 3.0, determined in a concentration of 0.5 g/100 ml in a solvent consisting of N,N-dimethylacetamide at a temperature of 30° C.

Preferably, the B-stage thermosetting resin composition of the present invention is soluble in the above-mentioned organic solvents.

The B-stage thermosetting resin composition of the present invention can be produced by the following methods:

1. The modified imide oligomer (A) and the organic compound having epoxy groups (B) are dissolved in an organic solvent and are partially reacted with each other by heating the resultant solution at a predetermined elevated temperature of, for example, from 35° C. to 200° C., while evaporating away the organic solvent from the solution.
2. The modified imide oligomer (A) and the organic compound having epoxy groups (B) are mixed with each other, and the mixture is melted to allow the elements (A) and (B) to partially react with each other, and the melt is then immediately solidified by cooling.

The thermosetting resin composition or the B-stage thermosetting resin composition of the present invention is easily converted to a shaped article by curing at a high temperature of from 100° C. to 250° C., preferably from 120° C. to 200° C., optionally in the presence of a curing catalyst.

The thermosetting resin composition or the B-stage thermosetting resin composition of the present invention in the form of a solution in an organic solvent can be converted to a cured, shaped solid article by shaping the solution into a predetermined form or impregnating the solution in a fibrous substrate, heating the resultant shaped material while allowing the organic solvent to gradually evaporate away from the material at an elevated temperature.

The resultant cured article is substantially not soluble in the organic solvents, and exhibits a high solvent-resistance, satisfactory mechanical properties, for example, flexural modulus and flexural strength, and an excellent heat resistance.

Also, the thermosetting resin composition and the B-stage thermosetting resin composition of the present invention is useful as an effective component of adhesive agents having an excellent heat resistance.

EXAMPLES

The present invention will be further explained by way of specific examples and referential examples which, however, are representative and do not restrict the scope of the present invention in any way.

In the referential examples, the logarithmic viscosity number ($\eta_{inh}$) of the imide oligomer was determined in the following manner.

The imide oligomer was uniformly dissolved in a concentration of 0.5 g/100 ml in a solvent consisting of N,N-dimethyl acetamide. The viscosities of the solvent and the resultant solution were measured at a temperature of 30° C. The logarithmic viscosity number ($\eta_{inh}$) of the imide oligomer was calculated in accordance with the following equation.

$$\eta_{inh} = \frac{\ln(V_S/V_0)}{C}$$

wherein C represents a concentration of the imide oligomer in the solution, $V_S$ represents a viscosity of the imide oligomer solution and $V_0$ represents a viscosity of the solvent.

The solubility of the imide oligomer was evaluated in the following manner.

The imide oligomer was evenly dissolved in 100 ml of a solvent consisting of dioxane or N,N-dimethylacetamide at a temperature of 20° C., and a saturated concentration of the imide oligomer in the solvent was determined. The solubility of the imide oligomer was represented in four classes in accordance with the saturated concentration.

| Class | Saturated concentration (g/100 ml) |
| --- | --- |
| 4 | >20 |
| 3 | from 10 to 20 |
| 2 | from 3 to 10 |
| 1 | <3 |

The thermal decomposition temperature at which the thermal decomposition of the imide oligomer started, and a 5% thermal weight reduction temperature at which the imide oligomer exhibited a weight reduction of 5% based on the original weight of the imide oligomer, were determined by a thermogravimetric analyzer (trademark: DR-30 (TGA-30), made by Shimazu Corporation)

The melting point of the imide oligomer and the B-stage thermosetting resin composition were determined by measuring the temperature at which the imide oligomer became molten on a heating plate.

The second-order transition temperature (Tg) of the solid imide oligomer was determined by using a differential thermal analyzer (trademark: DSC-2C, made by Perkin Elmer).

REFERENCE EXAMPLE 1 confirmed that the modified imide oligomer had hydroxyl groups located at the terminals of the oligomer molecule.

The specific properties of the modified imide oligomer are shown in Table 1.

REFERENTIAL EXAMPLES 2 to 4

In each of Referential Examples 2 to 4, a modified imide oligomer in the form of fine particles was prepared from the compound in the amounts as indicated in Table 1 and in the same manner as mentioned in Referential Example 1.

The analytical results of the modified imide oligomer by the infrared spectroscopic analyzer and by the H-NMR analyzer are the same as those obtained from Referential Example 1.

The physical properties of the resultant modified imide oligomer are shown in Table 1.

TABLE 1

| | Component compounds for modified imide oligomer | | | | | | Physical properties of modified imide oligomer | | | |
|---|---|---|---|---|---|---|---|---|---|---|
| | | | | | | | | | | Thermal property |
| Referential Example No. | Tetracarboxylic acid dianhydride | | Aromatic diamine | | Modifying monoamine | | Logarithmic viscosity number ($\eta_{inh}$) | Solubility | | Melting point (°C.) | Thermal decomposition temperature (°C.) |
| | Type | Amount (mole) | Type | Amount (mole) | Type | Amount (mole) | | $DMA_c$ | Dioxane | | |
| 1 | a-BPDA*¹ | 0.12 | TPE-R*² | 0.9 | mAOH*⁴ | 0.06 | 0.08 | 4 | 4 | 240 | 400 |
| 2 | " | 0.11 | " | 0.10 | " | 0.02 | 0.14 | 4 | 4 | 265 | 447 |
| 3 | " | 0.12 | " | 0.09 | pAOH*⁵ | 0.06 | 0.08 | 4 | 4 | 238 | 412 |
| 4 | " | 0.12 | BAPP*³ | 0.09 | " | 0.06 | 0.08 | 4 | 4 | 225 | 405 |

Note:
*¹(a-BPDA) . . . 2,3,3',4'- biphenyltetracarboxylic dianhydride
*²(TPE-R) . . . 1,3-bis(4-aminophenoxy)benzene
*³(BAPP) . . . 2,2-bis[4-(4-aminophenoxy)phenyl]propane
*⁴(mAOH) . . . m-aminophenol
*⁵(pAOH) . . . p-aminophenol A flask with a capacity of 500 ml was charged with a mixture of the following components:

a) 35.63 g (0.12 mole) of 2,3,3',4'-biphenyltetracarboxylic dianhydride (a-BPDA),
b) 26.31 g (0.09 mole) of 1,3-bis(4-aminophenoxy)benzene (TPE-R),
c) 6.55 g (0.06 mole) of m-aminophenol and,
d) 275 g of N,N-dimethylacetamide ($DMA_c$).

The mixture was stirred in a nitrogen atmosphere at a temperature of 50° C. for one hour to provide an amic acid oligomer, and the resultant amic acid oligomer solution was then heated to a temperature of 185° C. and stirred at this temperature for 2 hours, to provide a modified imide oligomer having terminal hydroxyl groups.

After cooling to room temperature (around 25° C.), the resultant modified imide oligomer solution was poured into water to deposit the modified imide oligomer in the form of fine particles. The deposited, modified imide oligomer particles were collected by filtration, washed twice with methyl alcohol at a temperature of 25° C., and dried under a reduced pressure. Accordingly, a modified imide oligomer in the form of fine yellowish white particles and having a logarithmic viscosity number of 0.08 at 30° C. was obtained.

When subjected to an infrared spectroscopic analysis, the modified imide oligomer exhibited a specific absorption of the imide structure at 1780 cm$^{-1}$, 1725 cm$^{-1}$ and 720 cm$^{-1}$.

Also, when subjected to H-MMR analysis, the modified imide oligomer exhibited the presence of specific hydrogen atoms in hydroxyl groups, and thus it was

EXAMPLE 1

A solution of a thermosetting resin composition was prepared by evenly dissolving 4.0 g of the fine particles of the modified imide oligomer having terminal hydroxyl groups and prepared in Referential Example 1, 0.71 g of bisphenol A glycidylether type epoxy compounds having an epoxy equivalent of about 190 (available under the trademark of Epicoat 828, from Yuka Shell Co.), and 0.01 g of a catalyst consisting of triphenylphosphine in 16 g of a solvent consisting of N,N-dimethylacetamide ($DMA_c$) at room temperature (around 25° C.).

The resultant solution composition was evenly applied to a surface of a glass plate, and the resultant layer of the solution composition was heat-treated at a temperature of 175° C. for 14 hours to evaporate away the solvent from the layer.

The resultant dried and cured article in the form of a thin film exhibited the thermal properties as indicated in Table 2.

EXAMPLES 2 to 4

In each of Examples 2 to 4, the same procedures as those described in Example 1 were carried out, except that the modified imide oligomer used was of the type and in the amount as indicated in Table 2, the epoxy compounds and triphenylphosphine were used in the amounts as indicated in Table 2 and in Example 2, and 0.20 g of a phenol novolak (available under the trademark of Phenol Novolak H-3, from Meiwa Kasei Co.), were added to the composition solution.

The resultant cured thin film of the thermosetting resin composition exhibited the thermal properties as indicated in Table 2.

COMPARATIVE EXAMPLE 1

A comparative thermosetting resin composition solution was prepared by evenly dissolving 2.0 g of a phenol novolak compound (Phenol Novolak H-3), 3.7 g of a bisphenol A glysidylether type epoxy compound (Epicoat 828, epoxy equivalent: about 190), and 0.04 g of a catalyst consisting of triphenylphosphine in 15 g of a solvent consisting of $DMA_c$.

The comparative composition solution was converted to a cured thin solid film in the same manner as described in Example 1.

The resultant cured thin film of the comparative composition exhibited the thermal properties as indicated in Table 2.

EXAMPLE 5

A thermosetting resin composition was prepared by mixing 2.5 g of the modified imide oligomer having terminal hydroxyl groups and prepared in Referential Example 1, 5.0 g of a bisphenol A glycidylether type epoxy compound (Epicoat 828, epoxy equivalent: about 190) and 1.5 g of a phenol novolak compound (Phenol Novolak H-3) in a flask having a capacity of 50 ml.

The thermosetting resin composition was heated at a temperature of 140° C. for 15 minutes, while stirring, to cause the modified imide oligomer to be gradually dissolved in and partially reacted with the epoxy compound. The resultant partially reacted composition was cooled to room temperature (about 25° C.), and a solid B-stage thermosetting resin composition having a melting point of 90° C. was obtained.

The B-stage resin composition was then finely pulverized, the fine B-stage resin composition particles in an amount of 5 g were mixed with 0.05 g of a catalyst consisting of triphenylphosphine, the mixture in the form of a fine powder was spread on a surface of a glass plate to provide a thin layer of the mixture, and then heat-treated in a hot air dryer at a temperature of 200° C. for 14 hours to provide a thin film of a cured resin composition.

The cured resin composition film exhibited the thermal properties as indicated in Table 2.

COMPARATIVE EXAMPLE 2

A comparative cured thin film was prepared in the same manner as described in Example 5, except that a comparative B-stage thermosetting resin composition was prepared from 2.3 g of the phenol novolak compound and 5.0 g of the bisphenol A glycidylether type epoxy compound, without using the modified imide oligomer.

The thermal properties of the resultant cured thin film are indicated in Table 2.

EXAMPLE 6

The same procedures as those in Example 5 were carried out except that the fine particles of the B-stage thermosetting resin composition were placed in a dish-shaped mold provided with a cavity having a depth of 1.2 mm, a length of 50 mm and a width of 10 mm, melted at a temperature of 110° C., and then cured by heating to a temperature of 200° C., under a pressure, and over a time of 30 minutes. The resultant molded, cured article was then cooled removed from the mold, and finally, after-cured at a temperature of 200° C. for 14 hours. The resultant cured shaped article had a thickness of 1.2 mm, a length of 50 mm, and a width of 10 mm.

The thermal properties of the cured shaped article are indicated in Table 2.

Further, the cured shaped article was subjected to a bending test in accordance with ASTM D-790, at a testing speed of 1 mm/min, and as a result, the cured shaped article exhibited a flexural modulus of 430 $kg/mm^2$ and a flexural strength of 14 $kg/mm^2$.

TABLE 2

| | Composition of thermosetting resin composition | | | | | Thermal properties of cured resinous composition | | |
|---|---|---|---|---|---|---|---|---|
| | Modified imide oligomer | | Amount of epoxy compound (Epicoat 828) (g) | Amount of phenol novolak (H-3) (g) | Amount of triphenyl phosphine (g) | Tg (°C.) | Thermode- composing temperature (°C.) | 5% thermal weight reduction temperature (°C.) |
| Example No. | Type (Referential example in which the oligomer was prepared) | Amount (g) | | | | | | |
| Example 1 | Referential Example 1 | 4.0 | 0.71 | 0 | 0.01 | 139 | 278 | 360 |
| Example 2 | Referential Example 2 | 2.0 | 3.80 | 0.20 | 0.04 | 138 | 290 | 365 |
| Example 3 | Referential Example 3 | 4.0 | 0.71 | 0 | 0.01 | 163 | 282 | 365 |
| Example 4 | Referential Example 4 | 4.0 | 0.62 | 0 | 0.01 | 152 | 285 | 360 |
| Comparative Example 1 | — | — | 3.70 | 2.00 | 0.03 | 134 | 260 | 345 |
| Example 5 | Referential Example 1 | 2.5 | 5.00 | 1.50 | 0.05 | 125 | 300 | 365 |
| Comparative Example 2 | — | — | 5.00 | 1.75 | 0.05 | 111 | 265 | 330 |
| Example 6 | Referential Example 1 | 2.5 | 5.00 | 1.50 | 0.05 | 123 | 282 | 370 |

COMPARATIVE EXAMPLE 3

Preparation of comparative modified imide oligomer

A flask with a capacity of 500 ml was charged with a mixture of the following component:

a) 38.67 g (0.12 mole) of 3,3',4,4'-benzophenonetetracarboxylic dianhydride (BTDA), b) 26.31 g (0.09 mole) of 1,3-bis(4-aminophenoxy)benzene (TPE-R), c) 6.55 g (0.06 mole) of m-aminophenol and, d) 275 g of N,N-dimethylacetamide ($DMA_c$).

In the same manner as in Referential Example 1, the mixture was stirred in a nitrogen atmosphere at a temperature of 50° C. for one hour to provide an amic acid oligomer, and the resultant amic acid oligomer solution was then heated to a temperature of 185° C., to provide a comprative modified imide oligomer having terminal hydroxyl groups. In the imidization stage, the resultant imide oligomer was deposited.

The deposited comparative imide oligomer was collected by filtration, washed twice with methyl alcohol at a temperature of 25° C., and dried under a reduced pressure. Accordingly, a comparative modified imide oligomer in the form of fine yellowish particles was obtained.

The analytical results of the comparative modified imide oligomer by the infrared spectroscopic analyzer were the same as those in Referential Example 1. Also, it was confirmed that the resultant comparative modified imide oligomer did not exhibit a melting point thereof.

In the same manner as in Example 1, a comparative thermosetting resin composition was subjected to the preparation of a comparative thermosetting resin composition, but because the comparative modified imide oligomer did not dissolve in a solvent consisting of N,N-dimethylacetamide ($DMA_c$), it was impossible to provide the required thermosetting resin composition.

What is claimed is:

1. A thermosetting resin composition comprising:
(A) at least one modified imide oligomer having terminal hydroxyl groups, which oligomer is a reaction product of (a) a tetracarboxylic acid component consisting essentially of (i) 70 to 100 molar % of a principal acid ingredient consisting of at least one member selected from the group consisting of biphenyltetracarboxylic acids, and dianhydrides, esters and salts thereof and (ii) 0 to 30 molar % of an additional acid ingredient consisting of at least one member selected from aliphatic to tetracarboxylic acids and other aromatic tetracarboxylic acids than biphenyltetracarboxylic acids, and dianhydrides, esters and salts thereof, with (b) an amine component consisting essentially of (iii) a principal diamine ingredient consisting of at least one aromatic diamine compound and (iv) a modifying monoamine ingredient consisting of at least one monoamine compound having at least one hydroxyl group, in a reaction medium, is provided with imide structures and terminal hydroxyl groups and exhibits a logarithmic viscosity number of from 0.01 to 1 determined at a concentration of 0.5 g/100 ml in a solvent consisting of N,N-dimethylacetamide at a temperature of 30° C.; and
(B) at least one organic compound having at least two epoxy groups.

2. The resin composition as claimed in claim 1, wherein the imide oligomer has a melting point of from 150° C. to 280° C.

3. The resin composition as claimed in claim 1, wherein the principal acid ingredient (i) of the tetracarboxylic acid component (a) comprises at least one member selected from the group consisting of 3,3',4,4'-biphenyltetracarboxylic acid and 2,3,3',4'-biphenyltetracarboxylic acid, and dianhydrides, lower alkyl esters, and salts thereof.

4. The resin composition as claimed in claim 1, wherein the additional acid ingredient (ii) of the tetracarboxylic acid component, (a) comprises at least one member selected from the grouping consisting of 3,3',4,4'-benzophenonetetracarboxylic acid, pyromellitic acid, 2,2-bis(3',4'-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, bis(3,4-dicarboxyphenyl)sulfone, aliphatic tetracarboxylic acids and dianhydrides, lower alkyl esters, and salts of the above-mentioned acids.

5. The resin composition as claimed in claim 1, wherein the principal diamine ingredient (iii) of the amine component (b) comprises at least one member selected from the group consisting of diaminodiphenylether compounds, diaminodiphenylalkane compounds, diamino-bis(phenoxy)diphenylpropane compounds, biphenyldiamine compounds, and diamino-bis(phenoxy)benzene compounds.

6. The resin composition as claimed in claim 1, wherein the modifying monoamine ingredient (iv) of the amine component (b) comprises at least one member selected from the group consisting of aminophenol, aminocresol, 4-hydroxy-4'-amino-diphenylether, 4-hydroxy-4'-aminobiphenyl, aminobenzyl alcohol, aminoethanol, aminopropanol, aminobutanol, and 2-amino-2-methyl-1,3-propanediol.

7. The resin composition as claimed in claim 1, wherein the modified imide oligomer (A) is of the formula (I):

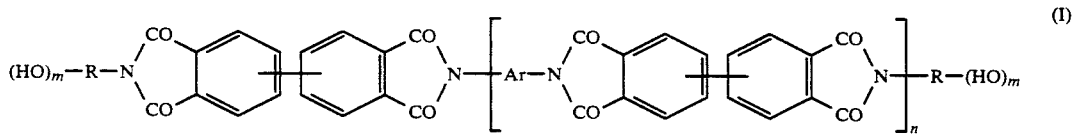

wherein R is a divalent or trivalent organic group derived from modifying monoamine ingredietn (iv), Ar is an aromatic group derived from aromatic diemine (iii) n represents zero or an integer of from 1 to 80, and m represents an integer of 1 or 2.

8. The resin composition as claimed in claim 1, wherein the total equivalent of the acid dianhydride groups in the tetracarboxylic acid component (a) is substantially equal to the total equivalent of the amino groups in the amine component (b).

9. The resin composition as claimed in claim 1 or 8, wherein, in the amine component (b), the modifying monoamine ingredient (iv) is in an amount of from 3 to 70 molar %.

10. The resin composition as claimed in claim 1, wherein the modified imide oligomer (A) is in a content of from 1 to 95% based on the total weight of the modified imide oligomer (A) and the epoxy group-having organic compound (B).

11. The resin composition as claimed in claim 1, wherein the epoxy group-having organic compound (B) is selected from the group consisting of epoxidized bisphenol A compounds, epoxidized bisphenol F compounds, epoxidized resorcinol compounds, epoxidized tetrahydroxydiphenylethane compounds, epoxidized phenolic novolak compounds, epoxidized cresol novolak compounds, epoxidized polyolefin compounds, epoxidized cycloaliphatic compounds, and epoxidized soyabean oils.

12. The resin composition as claimed in claim 1, wherein the modified imide oligomer (A) and the organic compound having epoxy groups (B) are in the state of a partial reaction product thereof.

13. The resin composition as claimed in claim 1, wherein the partial reaction product of the modified imide oligomer (A) with the organic compound having epoxy groups (B) exhibits a softening or melting point of from 35° C. to 200° C.

14. The resin composition as claimed in claim 12, wherein the partial reaction product of the modified imide oligomer (A) with the organic compound having epoxy groups (B) exhibits an apparent logarithmic viscosity number of from 0.1 to 5.0 determined at a concentration of 0.5 g/100 ml in a solvent consisting of N,N-dimethyl acetamide at a temperature of 30° C.

15. A cured material produced from the thermosetting resin composition as claimed in claim 1.

16. The resin composition as claimed in claim 1, wherein the tetracarboxylic acid component (a) consists essentially of (i) 70 to 100 molar % of a principal acid ingredient consisting of at least one compound selected from the group consisting of 2,3,3',4'-biphenyltetracarboxylic acid, and dianhydrides, lower alkyl esters, and salts thereof; and (ii) 0 to 30 molar % of the additional acid ingredient consisting of at least one member selected from the group consisting of other aromatic tetracarboxylic acids, dianhydrides, lower alkyl esters, and salts thereof.

17. The resin composition as claimed in claim 16, wherein the additional acid ingredient consists of at least one compound selected from the group consisting of 3,3',4,4'-biphenyltetracarboxylic acid, and dianhydrides, lower alkyl esters, and salts thereof.

* * * * *

UNITED STATES PATENT AND TRADEMARK OFFICE
CERTIFICATE OF CORRECTION

PATENT NO. : 5,147,943

DATED : September 15, 1992

INVENTOR(S) : Hiroshi INOUE and Tetsuji HIRANO

It is certified that error appears in the above-identified patent and that said Letters Patent is hereby corrected as shown below:

On the title page: Item [54]:

In the Title, delete "BIPHENYTETRACARBOXYLIC" and insert --BIPHENYLTETRACARBOXYLIC--

Claim 1, column 13, line 42, delete "to."

Claim 4, column 14, line 3, delete "," (the comma); and
column 14, line 4, delete "grouping" and insert --group--.

Claim 7, column 14, line 41, delete "ingredietn" and insert --ingredient--; and
column 14, line 42, delete "diemine (iii)" and insert --diamine (iii),--.

Signed and Sealed this

Twenty-first Day of September, 1993

Attest:

BRUCE LEHMAN

Attesting Officer   Commissioner of Patents and Trademarks